M. C. RASEN.
ELECTRIC FOOT WARMER.
APPLICATION FILED MAR. 1, 1920.
1,377,435. Patented May 10, 1921.
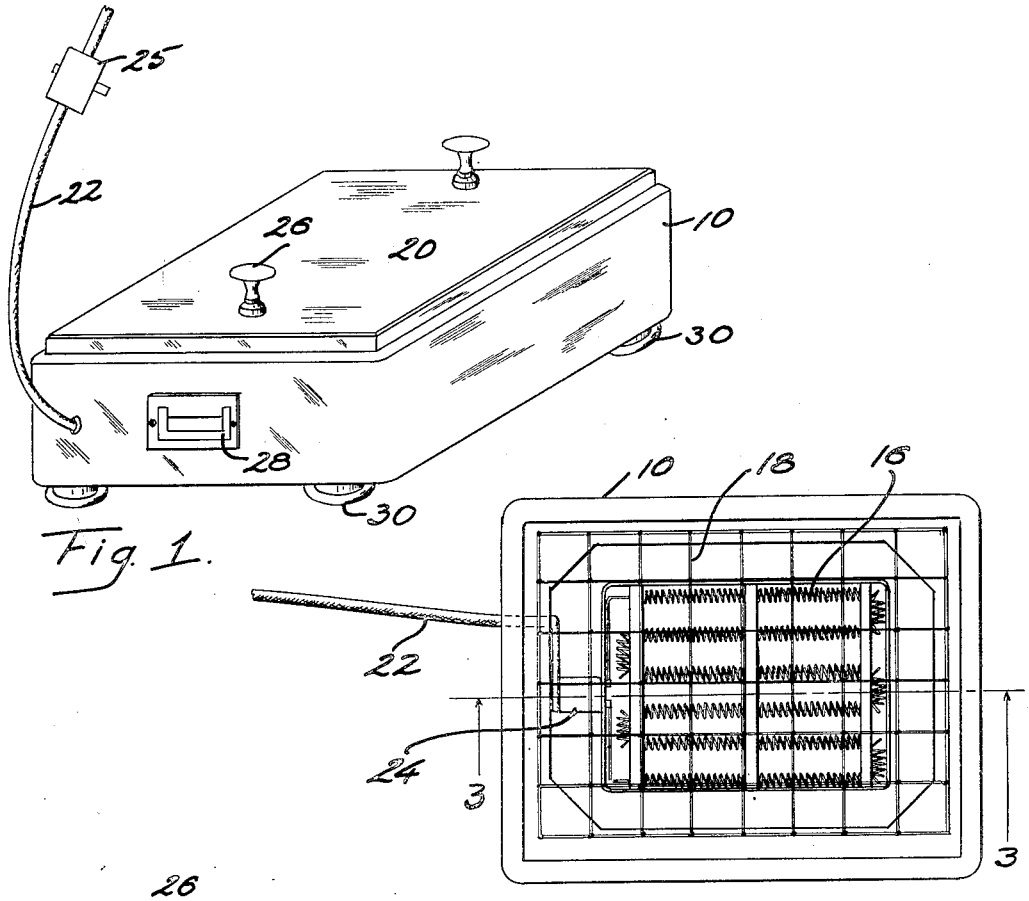
Fig. 1.
Fig. 2.
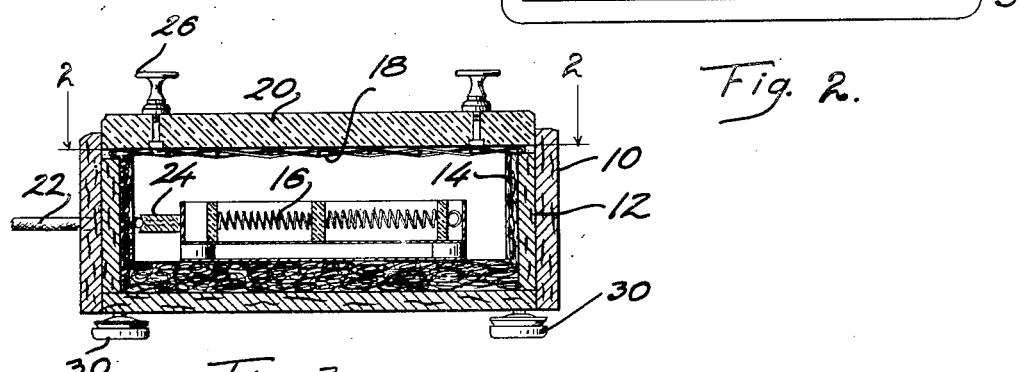
Fig. 3.
M. C. Rasen. Inventor ated in general by line 2—2 of Fig. 3, the marble slab being removed.

UNITED STATES PATENT OFFICE.

MATTHYS C. RASEN, OF DENVER, COLORADO.

ELECTRIC FOOT-WARMER.

1,377,435.  Specification of Letters Patent.  Patented May 10, 1921.

Application filed March 1, 1920. Serial No. 362,392.

*To all whom it may concern:*

Be it known that I, MATTHYS C. RASEN, a citizen of the United States, residing at the city and county of Denver and State of Colorado, have invented certain new and useful Improvements in Electric Foot-Warmers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a simple foot-warming device which consumes a small amount of current and remains warm for a considerable length of time after the current has been turned off.

Briefly, the invention comprises a cabinet containing an electric heater, with heat-insulating material between the heater and the cabinet, and a marble slab positioned directly above the heater, to be warmed thereby.

In the drawings:

Figure 1 is an isometric perspective.

Fig. 2 is a figure indicated in general by line 2—2 of Fig. 3, the marble slab being removed.

Fig. 3 is a vertical section on line 3—3 of Fig. 2.

The device comprises a cabinet having an outer framework 10, of well-finished wood, and inner wooden walls 12, lined with some heat-insulating material 14, such as asbestos. An electric heater 16 is held in the space within the cabinet, and a piece of wire fabric 18 is secured to the upper edges of the walls 12.

A marble slab 20 rests upon said wire, and upon said walls 12. An electric conductor 22 passes through the cabinet and is connected with the heater 16 by means of a plug 24, the current through the conductor being controlled by a switch 25. The slab 20 is provided with knobs 26, for lifting the same from the cabinet, and the cabinet itself is provided with countersunk swinging handles 28 on the ends, and slides 30 on the bottom.

The marble slab 20 quickly takes up the heat given off by the heater 16, and retains the same for a considerable time, so that a minimum of electric current is required.

The user's feet obviously are placed upon said slab between the knobs 26. These knobs 26 are provided in order that the slab, after being heated, may if desired be removed an placed in a bed for the purpose of warming the occupant, which is often required in case of sickness.

The device is handy, is a desirable piece of furniture, may be easily moved about, and is highly efficient.

I claim:

1. A foot warmer, comprising a casing, an insulating lining on the bottom and sides thereof, an electric heater therein, a removable heat-absorbing slab mounted on the casing above the heater, the sides of the casing extending up along the edges of the slab, and lifting means on the slab.

2. A foot warmer comprising a casing, an insulating lining on the bottom and sides thereof, an electric heater therein, a screen above the heater, and a removable marble slab mounted on the casing above the heater and the screen.

3. A foot warmer comprising a wooden casing, an asbestos lining on the bottom and sides thereof, an electric heater mounted in the cavity within the casing, a screen secured to the casing above the heater, a removable marble slab mounted upon the casing above the screen, slides on the under side of the casing to support the device and render the same easily movable on the floor, and handles countersunk in the ends of the casing.

In testimony whereof I affix my signature.

MATTHYS C. RASEN.